Dec. 19, 1950 — M. MURPHY — 2,534,470
ATTACHMENT FIXTURE FOR SAW GRINDING
Filed April 27, 1949
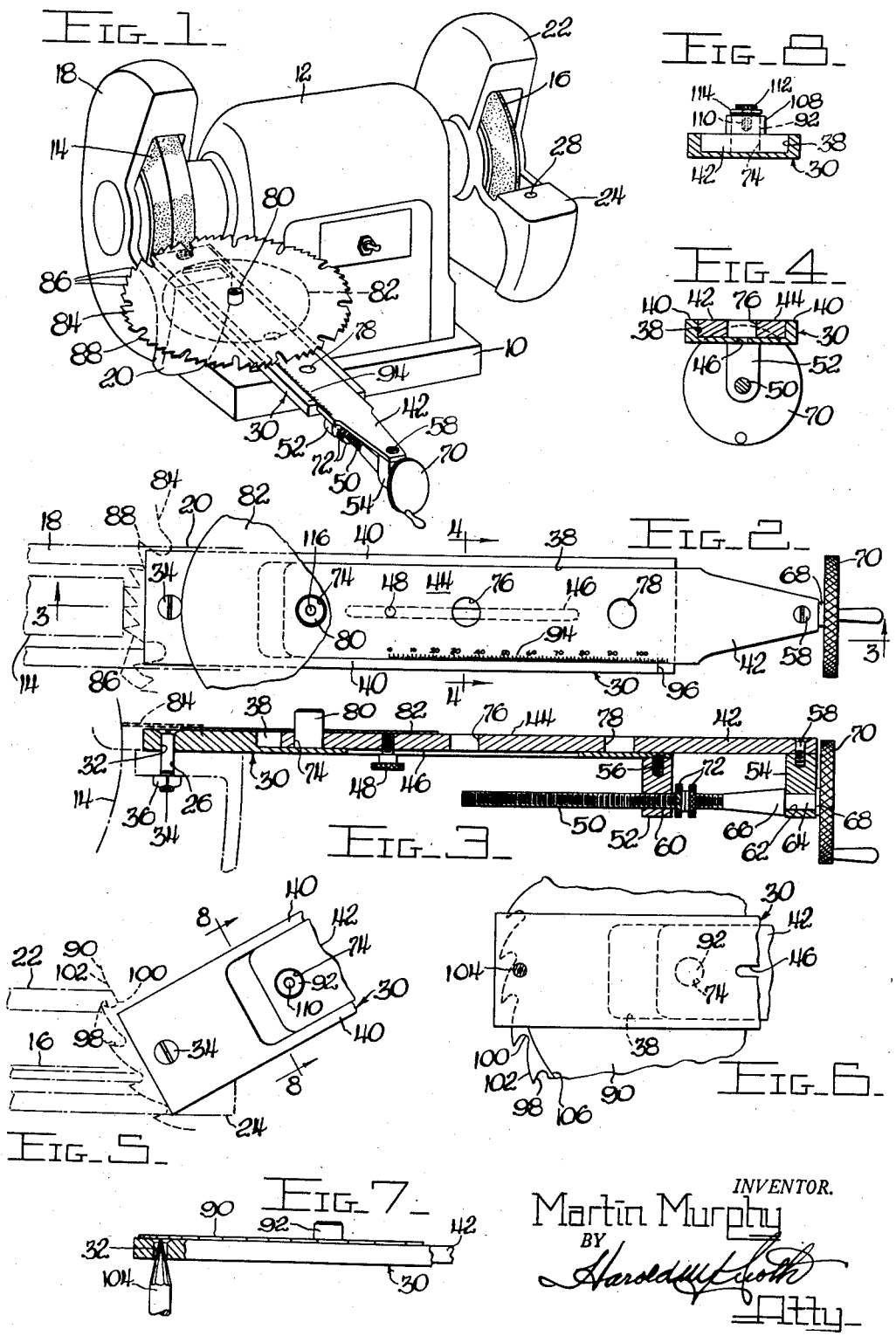
INVENTOR.
Martin Murphy
BY Harold M. Roth
Atty.

Patented Dec. 19, 1950

2,534,470

UNITED STATES PATENT OFFICE 2,534,470

ATTACHMENT FIXTURE FOR SAW GRINDING

Martin Murphy, Davenport, Iowa

Application April 27, 1949, Serial No. 89,857

3 Claims. (Cl. 76—37)

This invention relates to a saw grinding fixture and more particularly to such fixture as provided in the form of a simple and economical attachment for use with a conventional grinder. Still more particularly, the invention relates to a fixture for facilitating the sharpening of circular saws or like elements.

It is fundamental in the sharpening of a circular saw that the teeth thereof must be jointed; that is, ground or filed so that the points thereof lie on a perfect circle, the center of which is the axis of rotation of the saw. In circular saws of the so-called combination type that are provided with raker teeth, the raker teeth must lie on a circle of less diameter than the circle on which the cutting teeth lie. If the saw is excessively worn, it must be gummed; that is, the roots of the teeth must be filed or ground so that they too lie on a perfect circle concentric with the other circles just referred to. Heretofore, the process of accurately sharpening a saw has been extremely laborious, primarily because of the difficulty in maintaining concentricity to establish a basis from which the filing operation could be accomplished.

It is realized, of course, that various factory machines have been developed and are in use for manufacturing accurately finished saws. However, this is a field quite apart from sharpening or refinishing worn saws. It is accordingly a principal object of the present invention to provide an inexpensive fixture that may be conveniently and expeditiously used for resharpening saws—a fixture that may be economically purchased and easily used by individuals. It is another important object of the invention to provide a fixture as an attachment that may be readily mounted on a conventional grinder, such as the type commonly provided as a motor with grinding wheels at opposite ends of the armature shaft.

A still further and none the less important object is to provide a fixture having relatively few movable parts and one that is capable of handling circular saws through a wide range of sizes and in a wide range of types, such as rip, cut-off, combination, dado, etc. It is a characteristic and important feature of the fixture provided according to the present invention that it provides a fixed center on which the saw may be mounted for the operation of jointing the teeth; and another characteristic is that the fixture may be pivotally mounted with respect to the grinder so that a contour wheel may be utilized to gum the saw or grind the gullets in the teeth to a uniform depth. For the accomplishment of this latter object the fixture includes a pair of relatively movable parts one of which may be adjusted toward and away from the contour grinder and both of which may be pivoted to accommodate the particular shape of the backs of the teeth.

A still further object of the invention is to provide the fixture in the form of a pair of relatively movable parts, one of which may be fixedly mounted on the work or tool rest of the grinder to carry the other for adjustment to a selected position which establishes the axis on which the teeth are jointed; the adjusting means includes stop means against which the movable member which carries the saw may be moved in a direction toward the grinding wheel so that the raker teeth may be uniformly ground off on a circle that lies the required minimum distance within the circle of the points of the cutting teeth.

The foregoing and other important objects and desirable features of the invention will become apparent to those versed in the art as the following description proceeds in connection with the accompanying sheet of drawings wherein there is shown, by way of example, a preferred embodiment of the invention.

In the drawings:

Figure 1 is a perspective view showing the use of the fixture in the grinding of a combination saw;

Figure 2 is an enlarged plan view of the fixture shown in Figure 1, a portion of the saw being shown in dotted lines and a portion of the grinder being shown in dot-dash lines;

Figure 3 is a longitudinal sectional view taken substantially along the line 3—3 of Figure 2;

Figure 4 is a transverse sectional view taken substantially along the line 4—4 of Figure 2;

Figure 5 is a fragmentary plan view showing the use of the fixture in gumming a saw;

Figure 6 is a fragmentary bottom view showing the use of the fixture with a scribe or pencil for drawing the gumming circle;

Figure 7 is a side elevational view of the structure shown in Figure 6; and

Figure 8 is a transverse sectional view taken along the line 8—8 of Figure 5 and illustrating the use of a bushing on the stud means.

In Figure 1, the numeral 10 indicates the base of a well known type of grinder which comprises a centrally located motor 12 having an armature shaft (not shown) at opposite ends of which are respectively mounted a plain-faced grinding wheel 14 and a contour wheel 16. The wheel 14 is partially enclosed by a conventional guard 18 on which is carried a work or tool rest 20. The wheel 16 includes a similar guard 22 and work or tool rest 24. For the purposes of mounting the attachment fixture, the tool rest 20 is drilled to provide a vertical bore 26 (Figure 3) and the tool rest 24 is similarly provided with a vertical bore 28.

The attachment comprises an elongated base 30 of uniformly dimensioned flat stock having opposite end portions, one of which is drilled at 32 to provide a vertical bore which complements the bore 26 in the tool rest 20 to receive a countersunk bolt 34 on which is threaded a securing nut 36. The bore 32 in the base 30 provides part of the means for mounting the fixture on the tool rest 20. The drilled bores 26 and 28 respectively in the work rests 20 and 24 are identical, so that the fixture may be mounted on either work rest by means of the bolt 34. When the fixture is mounted on the tool rest 24 in front of the contour wheel 16, the bolt 34 may be slightly loosened so that the fixture may pivot in a horizontal plane about the vertical axis of the bolt.

The upper surface of the elongated base 30 is provided with an elongated channel 38. This channel opens upwardly and also at the outer end of the base and is further defined along each of its opposite sides by elongated side portions 40 which lie in a common horizontal plane (Figure 4). The channel serves as a slide or guide for carrying or mounting an elongated carrier member 42. The carrier, like the base, is made of uniformly dimensioned flat stock and is received by the base 30 in the channel 38, having an upper flat surface 44 which lies in or is coincident with the horizontal plane containing the side portions 40 of the base (Figure 4).

As best shown in Figures 2, 3 and 4, the base is provided at the bottom of the channel 38 with an elongated narrow slot 46. The carrier 44 is drilled and tapped to receive a guide or locking screw 48 (Figure 3). When the screw 48 is securely tightened the two members 30 and 42 will be locked together. However, the screw may be slightly loosened so that the carrier 42 may be propelled or moved longitudinally back and forth with respect to the base 30.

Relative movement or adjustment of the member is accomplished by means including a rotatable screw or threaded rod 50 and a pair of depending lugs 52 and 54 rigidly secured respectively by countersunk screws 56 and 58 to the base 30 and carrier 42. The lug 52 has a threaded aperture or bore 60 which complements the threaded rod 50. The lug 54 has an unthreaded aperture or bore 62 in which an unthreaded portion 64 of the rod is rotatably carried. The unthreaded or outer end of the rod includes a pair of enlarged portions 66 and 68 respectively at opposite sides of the lug 54, these portions providing collar means permitting rotation of the rod but constraining the rod against axial shifting with respect to the lug 52. The rod is provided with means in the form of a cranked hand wheel 70 by means of which the operator may turn the rod to cause the carrier to move in a selected longitudinal direction with respect to the base 30.

The rod or screw 50 is provided with stop means which may be selectively positioned to determine the extent to which the carrier 42 may be moved in one direction with respect to the base. This means preferably comprises a pair of knurled lock nuts 72 (Figure 3).

The carrier is provided with a plurality of similar vertical openings 74, 76 and 78. These openings are spaced in such manner as to selectively carry stud means for mounting a circular saw or like element on the carrier. In the use of the fixture as illustrated in Figures 1 and 2, the stud means comprises a stud or pintle 80 and a circular plate or shim 82. The saw is designated generally at 84 and is of the combination type having a plurality of cutting teeth 86 and a plurality of raker teeth 88. A saw of this type normally has considerable set and the shim or plate 82 is interposed between the under surface of the saw and the upper flat surface 40—44 provided by the fixture. As indicated in Figures 1, 2 and 3, the diameter of the plate is somewhat less than that of the saw 84. In a preferred construction the pintle 80 and the plate 82 may be secured together by either a press fit or by brazing.

In the event that a hollow ground saw is to be ground, such as that indicated at 90 in Figures 5, 6 and 7, there will be no need for the shim 82, since such saw has no set and a simple pintle 92 may be used in any of the openings 74, 76 or 78 to mount the saw rotatably on the carrier. In either case, the diameter of the saw will govern which of the openings 74, 76 or 78 is to be used, the opening 74 accommodating saws of relatively small diameter—such as 4 to 8″—and the opening 78 accommodating a pintle for mounting larger saws—such as those up to 24″ in diameter.

For the purpose of facilitating the use of the fixture, the carrier is provided with a scale 94 and one of the sides 40 of the base has an indicating mark 96 thereon. The threading of the rod 50 is preferably such that one-quarter turn of the wheel 70 will advance or retract the carrier 1/64 of an inch.

The saw 90 has a plurality of teeth which are formed so that each includes a comparatively arcuate face 98, a gullet 100 and a curved back 102. The pivotal mounting of the fixture on the tool rest 24 for use with the contour wheel 16 enables accurate grinding of the gullets 100, as will presently appear.

As shown in Figures 6 and 7, the fixture may be removed from the grinder and may be used to draw the circle for indicating the extent of gumming. For this purpose, the carrier 42 and base 30 are relatively adjusted so that the particular saw occupies substantially the position occupied by the saw 90 in Figures 6 and 7. A scribe or pencil, as indicated at 104, may be inserted upwardly through the bore 32 and the saw may be rotated by hand so that the point of the scribe or pencil scribes a circle on the saw as indicated by the line 106 in Figure 6.

Inasmuch as saws of larger diameter will have larger central apertures than those provided in smaller saws, provision is made for equipping the pintles 80 and 92 with bushings. Such bushing is indicated at 108 in Figure 8 on the pintle 92. This pintle is provided with a tapped bore 110 for receiving a cap screw 112 which, together with a washer 114, holds the bushing in place. The pintle 80 has a tapped bore 116 for a like purpose. These details may, of course, be varied.

*Operation and use*

In the use of the fixture for jointing the saw 84, the saw will be mounted on the stud means comprising the pintle 80 and circular shim 82. If the saw is of a relatively small diameter as indicated in Figures 1, 2 and 3, the stud means will be mounted in the innermost opening 74. The stop or lock nuts 72 will be backed off sufficiently to permit free adjustment of the carrier 42 with respect to the base, which adjustment will, of course, be an adjustment with respect to the face of the grinding wheel 14, since the fixture is rigidly mounted on the tool rest 20 and extends horizontally outwardly therefrom. The user may now rotate the saw slowly about the stud means until the points of all cutting teeth are ground off on a common circle. The saw will now be jointed. Since the curvature of the wheel 14 will affect the teeth, the carrier 42 can be locked against movement with respect to the base 30 and the saw turned over on the carrier and again rotated. Jointing of the teeth establishes the correct distance between the stud means or saw axis and the face of the wheel 14. The operator may now remove the saw and rotate the hand wheel 70 sufficiently to advance the carrier 1/64″, 1/32″, etc., as the case may be according to the diameter of the saw. In the case of the saw illustrated the advance should be about 1/64″. The stop or lock nuts 72 may then be run up against the lug 54 and thus prevent further advance of the carrier; however, the carrier may be freely retracted. The saw is then remounted on the stud means and moved angularly until a raker tooth is in front of the wheel 14. The hand wheel 70 may be turned inwardly until stopped by the lock nuts and thereupon the raker tooth may be ground off 1/64″ inside the circle of the cutting teeth. The operator may now back off the carrier a sufficient distance to permit angular movement thereof to the next raker tooth, and the carrier may again be moved in until stopped by the lock nuts. This operation will be repeated until all raker teeth are ground off the proper minimum distance inside the circle of the cutting teeth. Inasmuch as the shim 82 is used, the saw may be freely manually rotated without any drag of the set teeth on the fixture.

In the use of the fixture for the grinding of the saw 90, the teeth may be jointed in the same manner as the teeth of the saw 84 were jointed. In order that the saw 90 may be gummed, the fixture may be removed from the tool rest 20 and pivotally mounted by the bolt 34 on the other tool rest 24. The stop nuts 72 are backed off to give freedom of movement of the carrier relative to the base and the saw 90 is mounted on the pintle 92 which is here shown as being carried by the innermost opening 74 (according to the diameter of the saw). The angle of the carrier with respect to the contour wheel 16 may be adjusted simultaneously with the position of the carrier 42 with respect to the base 30 so that the wheel 16 grinds the individual gullets 100, the line 106 having previously been drawn to guide the operator, who will easily become skilled in working out the combined adjustments so that he will find it easy to quickly and properly gum the saw.

Summary

It will be seen from the foregoing that an inexpensive and highly efficient fixture has been provided for facilitating the grinding and sharpening of circular saws and that one particular advantage of the fixture is that it is provided as an attachment which anyone may use with a conventional grinder, thus eliminating the considerable expense normally involved in acquiring complicated and special machinery. It will be readily recognized that the fixture has rather wide application and will handle a wide range of sizes and many different types of saws, including dados and the like.

Other features and characteristics of the invention not specifically enumerated above will undoubtedly occur to those versed in the art, as likewise will many modifications and alterations in the preferred structure and use illustrated and described, all of which may be achieved without departing from the spirit and scope of the invention as defined in the appended claims.

What is claimed is:

1. For use with a grinder of the type having a rotating wheel and a fixed horizontal work rest: an attachment fixture for facilitating the grinding of a centrally apertured circular saw or like element, comprising an elongated relatively narrow base of substantially flat stock having a flat upper surface and first and second end portions, the first of which includes a flat under side having a pivot part on a vertical axis for mounting of the base on the work rest to extend horizontally outwardly from the wheel and for angular positioning about said axis, said base having its upper surface provided with a lengthwise channel closed at its bottom and opening upwardly and at said second end portion and defined at its sides by longitudinal portions lying in a common horizontal plane, said channel bottom having an elongated through slot lengthwise thereof; a carrier of elongated flat stock closely fitting and slidably carried in the channel and having an upper flat surface lying flush with said longitudinal portions in said horizontal plane so that a flat upper surface is presented on which such saw or like element may lie, said carrier having an end portion projecting longitudinally beyond the second end portion of the base and having a depending lug thereon; a retainer secured to the carrier and projecting downwardly and slidably through the aforesaid slot and having a headed end for retaining the carrier in the base; a lug depending from the base; said lugs having longitudinally alined apertures, one of which is internally threaded; a rod extending through the apertures and having a threaded portion cooperating with the threaded aperture and collar means cooperating with the lug having the unthreaded aperture, said rod projecting axially outwardly beyond said end portion of the carrier and having an operating handle thereon; and stud means projecting upwardly from the upper surface of the carrier member for rotatably receiving such apertured circular saw or like element.

2. The invention defined in claim 1, further characterized in that: the upper surface of the carrier is provided with a plurality of openings respectively on longitudinally spaced apart vertical axes; and the stud means is selectively and removably insertible in any one of the openings to provide for saws or like elements of different diameters.

3. The invention defined in claim 1, further characterized in that: the stud means includes a pintle projecting through a plate having a flat under surface to rest on the upper surface of the carrier, and a flat upper surface to support the saw or like element, the thickness of the plate being such as to adapt the plate to carry a saw having "set" so that the teeth of the saw will not drag on the upper surface of the carrier, and the area of the plate being such as to support a major portion of the saw without extending radially into the toothed portion of the saw, said pintle projecting at both surfaces of the plate to engage respectively the carrier and such saw or like element.

MARTIN MURPHY.

REFERENCES CITED

The following references are of record in the file of this patent:

UNITED STATES PATENTS

| Number | Name | Date |
|---|---|---|
| 112,838 | Otis | Mar. 21, 1871 |
| 319,455 | Coffin | June 9, 1885 |
| 324,434 | Totman | Aug. 18, 1885 |
| 502,319 | Rhodes | Aug. 1, 1893 |
| 633,725 | Mahar | Sept. 26, 1899 |
| 760,566 | Rose | May 24, 1904 |
| 775,035 | Hakes | Nov. 15, 1904 |
| 1,135,245 | Zuleg | Apr. 13, 1915 |
| 2,229,644 | Elder | Jan. 28, 1941 |
| 2,246,290 | Broxon | June 17, 1941 |
| 2,325,826 | Barrett | Aug. 3, 1943 |
| 2,328,650 | Johnson et al. | Sept. 7, 1943 |
| 2,436,004 | Hall | Feb. 17, 1948 |